Sept. 25, 1951  J. B. BAKER  2,569,275
DRILL ROD WITH ADAPTOR
Filed July 11, 1947

INVENTOR:
John B. Baker,
BY Carr Kerr Gravely,
HIS ATTORNEYS

Patented Sept. 25, 1951

2,569,275

UNITED STATES PATENT OFFICE 2,569,275

DRILL ROD WITH ADAPTER

John B. Baker, Canton, Ohio, assignor to The Timken Roller Bearing Company, Canton, Ohio, a corporation of Ohio Application July 11, 1947, Serial No. 760,373

2 Claims. (Cl. 287—2)

This invention relates to rotary percussion drills of the kind comprising a hollow drill rod and a separable drill bit threaded on one end thereof. Heretofore, the threaded bit receiving end of the hollow-drill has been formed integral therewith by factory machining operations which cannot be performed in the field.

The present invention has for its principal object a drill rod which may be quickly and easily and economically produced in the field from a length of standard hollow drill steel and a finished adaptor adapted to threadedly receive a conventional drill bit. The invention consists in a drill rod comprising a length of standard hollow drill steel and a complete factory finished adaptor having one end secured in a socket in one end of said hollow drill steel and the other or exposed end threaded to receive a conventional drill bit. The invention also consists in providing the adaptor intermediate between the ends thereof with a collar which seats against the socket end of said drill steel and forms a seat for the adjacent end of the separable drill bit. The invention also consists in forging the drill steel around the socket engaging end of the adaptor and in shaping said end to prevent relative rotary and endwise movement of said drill steel and adaptor. The invention also consists in the hereinafter described drill rod assembling process.

Figure 1:
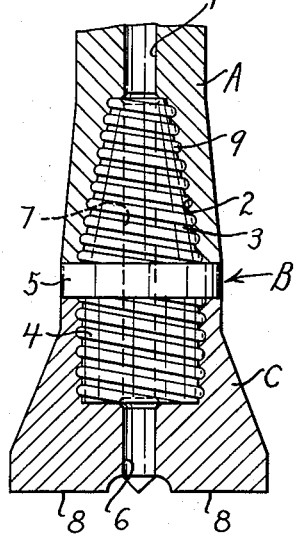
Figure 2:
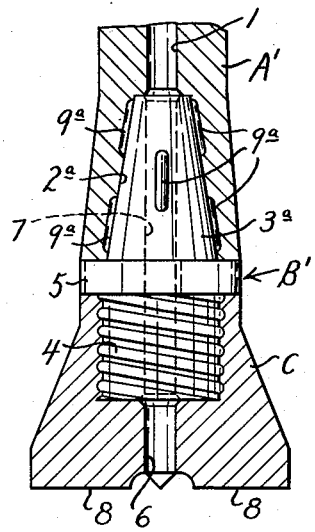
Figure 3:
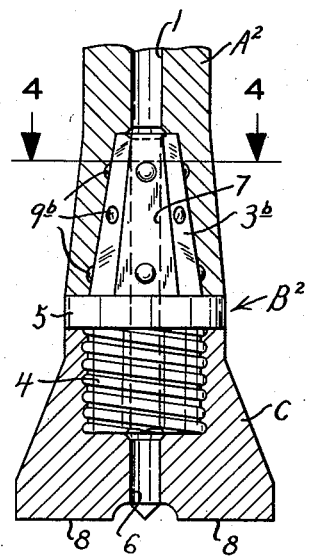
Figure 4:
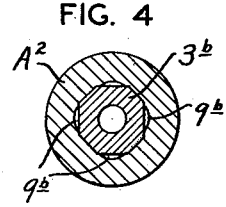

In the accompanying drawing, which forms part of this specification and wherein like symbols refer to like parts wherever they occur, Fig. 1 is a central longitudinal section through a drill rod and adaptor assembly embodying my invention, Fig. 2 is a similar view illustrating a modified construction, Fig. 3 is a similar view illustrating another modified construction; and Fig. 4 is a cross-sectional view on the line 4—4 in Fig. 3.

The drill rod shown in Fig. 1 of the accompanying drawing comprises a length of standard hollow drill steel A and a completely finished adaptor member B permanently secured in one end of the axial bore 1 of said drill steel. The axial bore 1 of the drill steel A is flared at one end thereof to provide a conical socket 2 at said end. The adaptor B has a conical inner end portion 3, which is permanently secured in the conical socket 2 in the end of the hollow drill steel A, a screw threaded cylindrical outer end portion 4 adapted for engagement with the screw threaded axial bore 6 of a conventional drill bit C and an intermediate circumferential flange or collar 5, which seats against said end of said drill steel and constitutes a seat for the adjacent end of said drill bit. The adaptor B has an axial bore 7 therethrough which cooperates with the axial bore 1 of the drill steel A and the axial bore 6 of the drill bit C to provide a passageway for conveying a cleansing fluid to the cutting edges 8 at the outer or working end of said drill bit. The conical inner end portion 3 of the adaptor B is helically threaded, as at 9, preferably from end to end and is secured in the conical socket 2 of the drill steel A against rotary and axial movement relative thereto by forging the socket end of said drill steel around said threaded inner end of said adaptor.

In the modified construction shown in Fig. 2, the conical socket engaging end $3a$ of the adaptor $B^1$ has a multiplicity of lugs $9a$ thereon that are spaced apart circumferentially and longitudinally thereof and are embedded in the wall of the conical socket $2a$ of the drill steel $A^1$ so as to prevent relative rotary and axial movement of said adaptor and drill.

In the construction shown in Figs. 3 and 4, the conical socket engaging end $3b$ of the adaptor $B^2$ is of polygonal cross-section with outstanding lugs or knobs $9b$ on the flat sides thereof for resisting relative rotary and axial movement of the adaptor and drill steel $A^2$.

In assembling the hereinbefore described drill rod, a piece of standard hollow drill steel is cut to the desired length and one end is then heated and the axial bore flared to form the conical socket therein. The socket end of the drill steel is then reheated to forging temperature and the conical end of the adaptor is inserted in the socket, after which the socket end of the drill steel is forged with suitable clamping dies around said conical end of said adaptor and fills in around the threads or other protuberances thereon. With the drill steel and adaptor thus permanently connected, the collar of the adaptor seats on the socket end of the drill steel and takes the end thrust thereof and is also adapted to transmit such end thrust to the drill bit when the latter is threaded on the outer end of the adaptor. The adaptor is made of an alloy steel which will remain sufficiently hard to prevent distortion of the thread on the outer drill bit receiving end of the adaptor and the collar thereof during the operation of hot forging this socket end of the drill steel around the inner or socket engaging end of said adaptor and during the time required for air cooling the forged end of said drill steel.

The above drill rod construction can be quickly and easily assembled in the field from a length of standard hollow drill steel and a finished adaptor; and it provides a permanent rigid connection between said adaptor and drill steel which prevents both relative axial and rotary movement thereof. The collar of the adaptor serves to position it axially in the drill steel and also serves as a seat for the inner end of the separable drill bit and as a thrust transmitting member between the drill steel and drill bit.

In some cases, the residual heat remaining after the formation of the conical socket will be sufficient to enable the drill rod to be forged around the adaptor without reheating. In some cases, reheating may be necessary to bring the drill rod up to forging temperature. Such reheating may be before or after the insertion of the adaptor in the conical socket.

What I claim is:

1. A drill comprising a standard hollow drill steel having a conical socket in an end thereof, a finished drill bit mounting adapter having a conical inner end with a plurality of projections thereon and an outer threaded end, said inner and outer adapter ends being separated by a collar integrally formed on said adapter, said adapter having its inner conical end forged into the conical socket of the drill steel with the projections thereon imbedded in the material of said drill steel and the end of said drill steel abutting said collar, and a separable drill bit threaded on said outer end of the adapter to abut said integral collar.

2. The combination set forth in claim 1 wherein the conical inner end portion of said adapter has a multiplicity of flat side faces with spaced projections thereon that are imbedded in the wall of said conical socket during the operation of forging the socket end of said drill rod around said conical inner end portion of said adapter.

JOHN B. BAKER.

REFERENCES CITED

The following references are of record in the file of this patent:

UNITED STATES PATENTS

| Number | Name | Date |
|---|---|---|
| 87,778 | Hunt | Mar. 16, 1869 |
| 106,673 | De Zavala | Aug. 23, 1870 |
| 1,108,267 | Sparks | Aug. 25, 1914 |
| 1,169,642 | Heeter | Jan. 25, 1916 |
| 1,203,546 | Parsons | Oct. 31, 1916 |
| 1,209,346 | Sparks | Dec. 19, 1916 |
| 1,232,449 | Mellin | July 3, 1917 |
| 1,277,683 | Bell | Sept. 3, 1918 |
| 1,439,287 | Bell | Dec. 19, 1922 |
| 1,693,839 | Faudi | Dec. 4, 1928 |
| 1,813,015 | Bell | July 7, 1931 |
| 1,929,608 | Rea | Oct. 10, 1933 |
| 1,943,879 | Rea | Jan. 16, 1934 |
| 2,206,292 | Rosenberg | July 2, 1940 |
| 2,318,326 | Padley et al. | May 4, 1943 |
| 2,354,656 | Annesley | Aug. 1, 1944 |
| 2,370,603 | Zimmerman | Feb. 27, 1945 |